(12) United States Patent
Roelofs et al.

(10) Patent No.: US 11,245,716 B2
(45) Date of Patent: Feb. 8, 2022

(54) COMPOSING AND APPLYING SECURITY MONITORING RULES TO A TARGET ENVIRONMENT

(71) Applicant: International Business Machines Corporation, Armonk, NY (US)

(72) Inventors: Thomas M. Roelofs, Huizen (NL); Codur S. Pranam, Richmond (GB)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 16/407,764

(22) Filed: May 9, 2019

(65) Prior Publication Data
US 2020/0358803 A1    Nov. 12, 2020

(51) Int. Cl.
*H04L 29/06* (2006.01)

(52) U.S. Cl.
CPC ........ *H04L 63/1433* (2013.01); *H04L 63/102* (2013.01); *H04L 63/1416* (2013.01)

(58) Field of Classification Search
CPC ............... H04L 63/1433; H04L 63/102; H04L 63/1416; H04L 63/20
See application file for complete search history.

(56) References Cited

U.S. PATENT DOCUMENTS

| | | | | |
|---|---|---|---|---|
| 7,937,353 B2 * | 5/2011 | Bernoth | ............... | H04L 63/0263 706/46 |
| 9,692,784 B1 * | 6/2017 | Nenov | ................ | H04L 63/1416 |
| 10,868,825 B1 * | 12/2020 | Dominessy | ........... | H04L 43/065 |
| 11,012,472 B2 * | 5/2021 | Milazzo | .............. | H04L 63/1425 |
| 2007/0214503 A1 * | 9/2007 | Shulman | ............. | G06F 11/2257 726/22 |
| 2011/0185419 A1 * | 7/2011 | Boteler | ................... | G06F 21/55 726/22 |

(Continued)

FOREIGN PATENT DOCUMENTS

CN    107222491 A    9/2017

OTHER PUBLICATIONS

"Attack tree", Wikipedia, page last edited Feb. 26, 2019, 4 pps., <https://en.wikipedia.org/wiki/Attack_tree>.

(Continued)

*Primary Examiner* — Sarah Su
(74) *Attorney, Agent, or Firm* — Stephanie L. Carusillo

(57) ABSTRACT

In an aspect of the invention, the method includes one or more processors identifying events in the target environment that are associated with an indication of a security attack on the target environment. The method further includes composing rules based on the events and relating to an entity identifier that is fixed over a period of time in relation to an entity in the target environment. The method further includes weighting the rules according to a probability that the rule positively identifies a security attack. The method further correlating outputs of multiple activated rules relating to an entity identifier that are activated over time in response to events occurring in the target environment. The method further includes aggregating weightings from the multiple activated rules. The method further includes determining a score for an entity relating to the entity identifier based on the aggregated weightings.

17 Claims, 11 Drawing Sheets

(56) References Cited

U.S. PATENT DOCUMENTS

| | | | |
|---|---|---|---|
| 2014/0115663 A1* | 4/2014 | Fujishima | H04L 63/1408 726/3 |
| 2014/0165200 A1* | 6/2014 | Singla | G06F 21/56 726/23 |
| 2015/0058993 A1* | 2/2015 | Choi | G06N 7/005 726/25 |
| 2015/0269383 A1* | 9/2015 | Lang | H04L 63/20 726/1 |
| 2016/0019388 A1 | 1/2016 | Singla et al. | |
| 2016/0099953 A1* | 4/2016 | Hebert | H04L 63/1433 726/23 |
| 2016/0182561 A1* | 6/2016 | Reynolds, II | H04L 63/1466 726/1 |
| 2016/0285861 A1* | 9/2016 | Chester | H04L 63/0823 |
| 2016/0301709 A1 | 10/2016 | Hassanzadeh et al. | |
| 2017/0126740 A1 | 5/2017 | Ardila et al. | |
| 2017/0171225 A1* | 6/2017 | Pal | H04L 63/1416 |
| 2017/0171230 A1* | 6/2017 | Leiderfarb | H04L 63/145 |
| 2018/0176254 A1* | 6/2018 | Lam | H04L 63/1408 |
| 2018/0288063 A1* | 10/2018 | Koottayi | H04L 63/102 |
| 2020/0036743 A1* | 1/2020 | Almukaynizi | G06N 5/048 |
| 2020/0186569 A1* | 6/2020 | Milazzo | H04L 63/20 |
| 2020/0228544 A1* | 7/2020 | El-Moussa | H04L 63/145 |
| 2020/0327223 A1* | 10/2020 | Sanchez | G06F 21/554 |
| 2020/0374298 A1* | 11/2020 | Sirianni | H04L 63/1425 |
| 2021/0044607 A1* | 2/2021 | Seki | H04L 63/1425 |

OTHER PUBLICATIONS

Chuvakin, "SIEM and Badness Detection" Jul. 24, 2014, Gartner, 8 pps., <https://blogs.gartner.com/anton-chuvakin/2014/07/24/siem-and-badness-detection/>.

"Punching Hard—McAfee Nitro SIEM", InfoSec Nirvana, Oct. 20, 2014, 10 pps., <http://infosecnirvana.com/punching-hard-mcafee-nitro-siem/>.

"McAfee SIEM Correlation Rules and Engine Debugging", McAfee, 30 pps., downloaded from the Internet on Apr. 25, 2019, <https://kc.mcafee.com/resources/sites/MCAFEE/content/live/PRODUCT_DOCUMENTATION/25000/PD25633/en_US/McAfee%20SIEM%20Best%20Practices%20for%20Correlation%20Rules%20and%20Engine%20Debugging.pdf>.

Rothman, "SIEM best practices for advanced attack detection", TechTarget, May 2013, 11 pps., <https://searchsecurity.techtarget.com/tip/SIEM-best-practices-for-advanced-attack-detection>.

Mell et al., "The NIST Definition of Cloud Computing", National Institute of Standards and Technology, U.S. Department of Commerce, NIST Special Publication 800-145, Sep. 2011, 7 pages.

* cited by examiner

COMPOSING AND APPLYING SECURITY MONITORING RULES TO A TARGET ENVIRONMENT

BACKGROUND OF THE INVENTION

The present invention relates to security monitoring rules for identifying security attacks, and more specifically, to composing and applying security monitoring rules to a target environment.

Computer security, cybersecurity, or information technology (IT) security is the protection of computer systems from theft or damage to hardware, software, or electronic data, as well as a disruption or misdirection of services.

The field of security monitoring detects malicious activities in the information technology environment of an organization. For example, this may include monitoring corporate networks to identify attacks from outside and inside an organization.

The goal of security monitoring is to identify attacks that can compromise information technology systems that contain confidential information or attacks that can manipulate transactions. The goal of an organization's Security Operations Center is to identify such events and stop them from occurring.

SUMMARY

Aspects of the present invention disclose a method, computer program product, and system for composing and applying security monitoring rules to a target environment. The method includes one or more processors identifying events in the target environment that are associated with an indication of a security attack on the target environment. The method further includes one or more processors composing security monitoring rules based on the identified events and relating to an entity identifier that is fixed over a period of time in relation to an entity in the target environment. The method further includes one or more processors weighting the security monitoring rules according to a probability that the rule positively identifies a security attack. The method further includes one or more processors correlating outputs of multiple activated rules relating to an entity identifier that are activated over time in response to events occurring in the target environment. The method further includes one or more processors aggregating weightings from the multiple activated rules. The method further includes one or more processors determining a score for an entity relating to the entity identifier based on the aggregated weightings. The method further includes one or more processors providing an alert in response to a score for an entity meeting a threshold.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

Embodiments of the present invention recognize that challenges exist for implementing adequate rules, generally in a security information and event management (SIEM) system, based on data from different data sources, such as infrastructure logs, application logs, and network data. When rules are defined in a narrow way to reduce the number of alerts, there is a large probability of missing an attack because attackers can easily vary characteristics. For example, rules based on historic attack data, such as an Internet Protocol (IP) addresses from a known botnet, may easily miss current attacks.

When rules are defined in a general way, the alerts may contain information about the malicious behavior, but the volume of alerts can be unmanageable due to the overlap between normal and non-malicious behavior. For example, creating events based on account login failures may generate a large number of alerts.

Further embodiments of the present invention recognize that, within the field of security monitoring few guidelines exist on how to compose an effective rule base and build a system that optimally uses the output of the rules to identify an attack.

Embodiments of the present invention provide a method and system for composing and applying security monitoring rules to a target environment to provide a low number of false positives and false negatives by generically correlating the output of rules over time to aggregate a risk score of an attack. The method and system can compose rules for an entity in the target environment, such as an asset or a person, and further utilize a correlation application to combine the output of a rule base to aggregate risk scores for rules identifying the entity that are triggered over time. The rules may be STEM rules or statistical calculations and a model may be used to identify risk score and correlate anomalies based on user behavior, applications, or infrastructure components. The approach to compose rules is combined with the generic system to correlate the output.

Implementation of embodiments of the invention may take a variety of forms, and exemplary implementation details are discussed subsequently with reference to the Figures.

Figure 1:
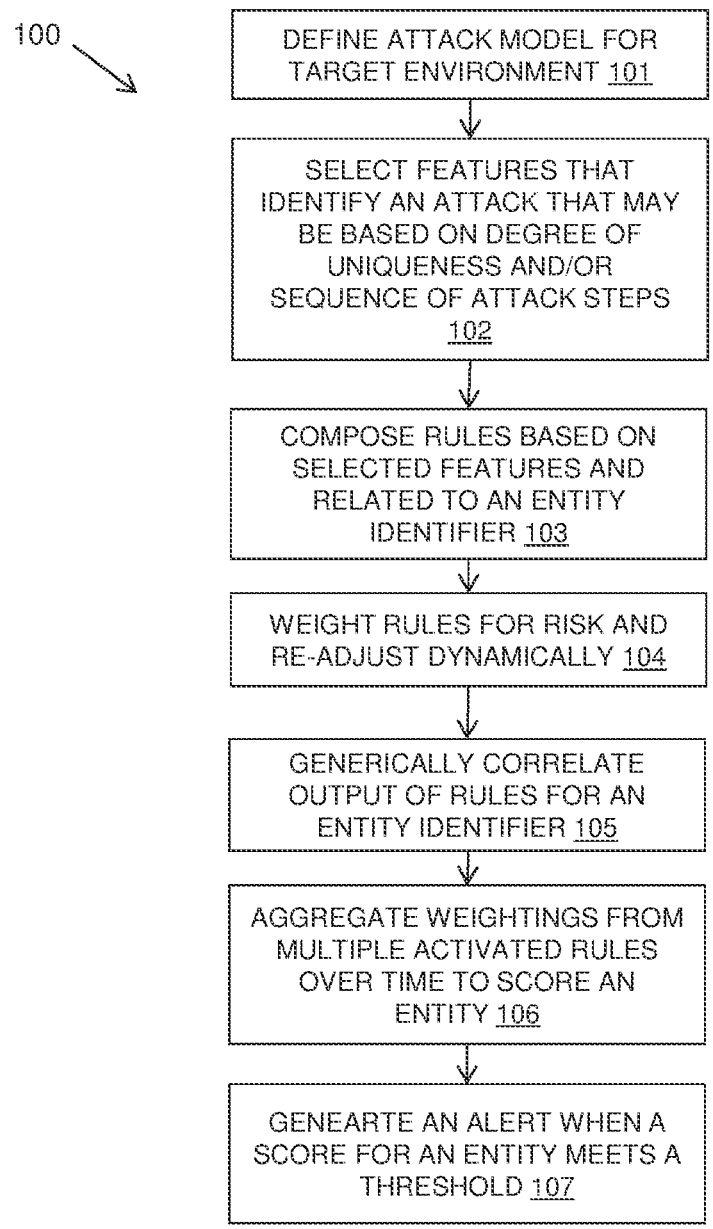
FIG. 1 is a flow diagram of an example embodiment of a method, in accordance with embodiments of the present invention.

Referring to FIG. 1, a flow diagram 100 shows an example embodiment of the described method of composing and applying security monitoring rules to a target environment. In an example embodiment, the target environment may be a concrete situation in which security monitoring is needed by keeping in mind the network topology, existing security controls, data flows, data at rest, and the digital processes. In various embodiments of the present invention, security system 700 (described in further detail with regard to FIG. 7) performs processes in accordance with the method depicted in flow diagram 100.

The method may select (in step 102) features in the form of events identifying an attack in the target environment. In one embodiment, the feature selection is carried out by first defining (in step 101) an attack model for the target environment, which indicates processes that may occur as an attack unfolds. In one embodiment, the attack model may be an attack tree, which defines paths of possible events in a security attack. In another embodiment, a list of critical applications may be made, and features may be defined on the basis of the queries that the users of the applications make, for example, on the basis of statistics. Any reasonable rule or output of a model may be used to define what an attacker may do.

The method may select (in step 102) features in the form of events in the attack model. Features are variables that will be used in the attack detection rules and used in a determination of whether an activity is malicious or not.

In one scenario, selecting features of the attack model (in step 102) can identify an attack based on a degree of uniqueness compared to normal activity in the target environment. In another scenario, selecting features of the attack model (in step 102) can also identify an attack based on a combination of steps carried out in an attack that are considered essential steps carried out by the attacker.

The method may compose (in step 103) security monitoring rules based on the selected features and related to an entity identifier. The entity identifier is fixed over a period of time in relation to an entity in the target environment. An entity may be an asset or a person in the target environment and the entity identifier may be an identifier that is fixed over time in relation to an entity, for example, an Internet Protocol (IP) address, hostname, user name, media access control (MAC) address.

An "entity" points towards the object (such as an IT asset) that the "actor" is using in the attack and the "entity identifier" to the type of value that may be used to identify the object (for example, by network address, name of the host etc.). A series of values of entity identifies may enable scores to be plotted in 2D or 3D for an entity.

The composed rules may be weighted (in step 104) for the probability that the rule positively identifies an actual attack. The weighting may be based on initial configured expert weightings based on a perceived match to malicious behavior. Embodiments of the present invention can dynamically re-adjust the weightings, as described further below based on analysis of security incidents or simulations.

The method may generically correlate (in step 105) the outputs of multiple activated rules over time relating to an entity identifier. Rules are activated in response to events occurring in the target environment.

The method may aggregate (in step 106) the weightings from multiple activated rules of the correlated rules over time to provide a correlated risk score for an entity relating to the entity identifier. If the weighting of the rules is dynamically re-adjusted due to analysis, the method can recalculate the correlated risk score for an entity, at any time. The aggregation (of step 106) of the weightings to form the risk score may be done linearly or non-linearly, for example, on the basis of a probability function.

The method may generate (in step 107) an alert in response to a score for an entity meeting a threshold.

In one embodiment, the method may use a conventional attack tree to identify security attacks on a target environment. Attack trees are conceptual diagrams showing how an asset might be attacked. Attack trees are multi-leveled diagrams that comprise one root, leaves, and children nodes of events of attacker steps. From the bottom up, child nodes are conditions that must be satisfied to make the direct parent node true; when the root is satisfied, the attack is complete. Each node may be satisfied only by its direct child nodes. A node may be the child of another node; in such a case, it becomes logical that multiple steps must be taken to carry out an attack.

In the described method, the attack tree is composed on basis of the local context of the target environment. For example, the concrete situation in which security monitoring is needed by keeping in mind the network topology, existing security controls, data flows, data at rest, and the digital processes.

Once the attack tree has been composed, rules may be defined on the basis of the attack tree. Features of the attack tree need to be selected that may be used effectively to identify an attack. Features may be events relating to a node of the tree.

The attack tree includes the attacker steps in the form of events. The events are caught into log records (e.g., an event may be "a connection from IP address 1 to IP address 2"). A feature is a variable that is used to define rules and generate the alert and therefore its selection is important. Features can be a lot of things, and feature selection is important because, if attack detection is based on the wrong features, then the alerts will be unhelpful. For the example of the connection from IP address 1 to IP address 2, the feature may be "the number of times in history that this combination has been seen," so if the feature is 20,567, then the connection has been seen a lot. However, if the feature is 1, then the connection is a new connection and quite a unique one, which may be indicative of new malicious behaviour in the network. Features may have numerical values or may be Boolean outcomes (TRUE/FALSE).

Two methods of selecting features for use in the rules are described and these may be used individually or in combination.

A first method for selecting features of the attack tree assumes that security attacks (e.g., cyber-attacks) are rare events. The amount of data related to a cyber security incident, such as a phishing attack or a web server compromise, is a very small fraction of the total amount of data produced by the day-to-day processes. The attackers try to be under the radar and change as little as possible in the target environment. Therefore, the first method for selecting features is based on "the degree of uniqueness" and is expressed in terms of uniqueness compared to normal, non-malicious behavior within the target environment. The uniqueness criterion is more sustainable compared to traditional approaches of comparing with attack signatures, since attackers can change the technical features, but manipulating all the non-malicious actions in the target environment is difficult.

The second method for selecting features of the attack tree works on the basis that the attacker must take several steps to get to the end objective of the attack. The attacker is likely to use existing system software or application functions to carry out steps once the attacker has gained access to the target environment. For example, attackers may use network protocols to perform reconnaissance or log on to applications once the attacker has maliciously obtained the credentials for accessing the data. In contrast to the first type of feature, the steps are not unique but are a plurality of essential steps for the attacker.

The described concepts of feature selection may be explained further with an example. An attacker wants to extract customer data from an organization. The attacker may gain access to an enterprise environment social engineering and connect a laptop or device into the network. Once connected to the network, the attacker can connect to a database and exfiltrate business data. Based on this example an attack tree, as shown in FIG. 2, can be created.

Figure 2:
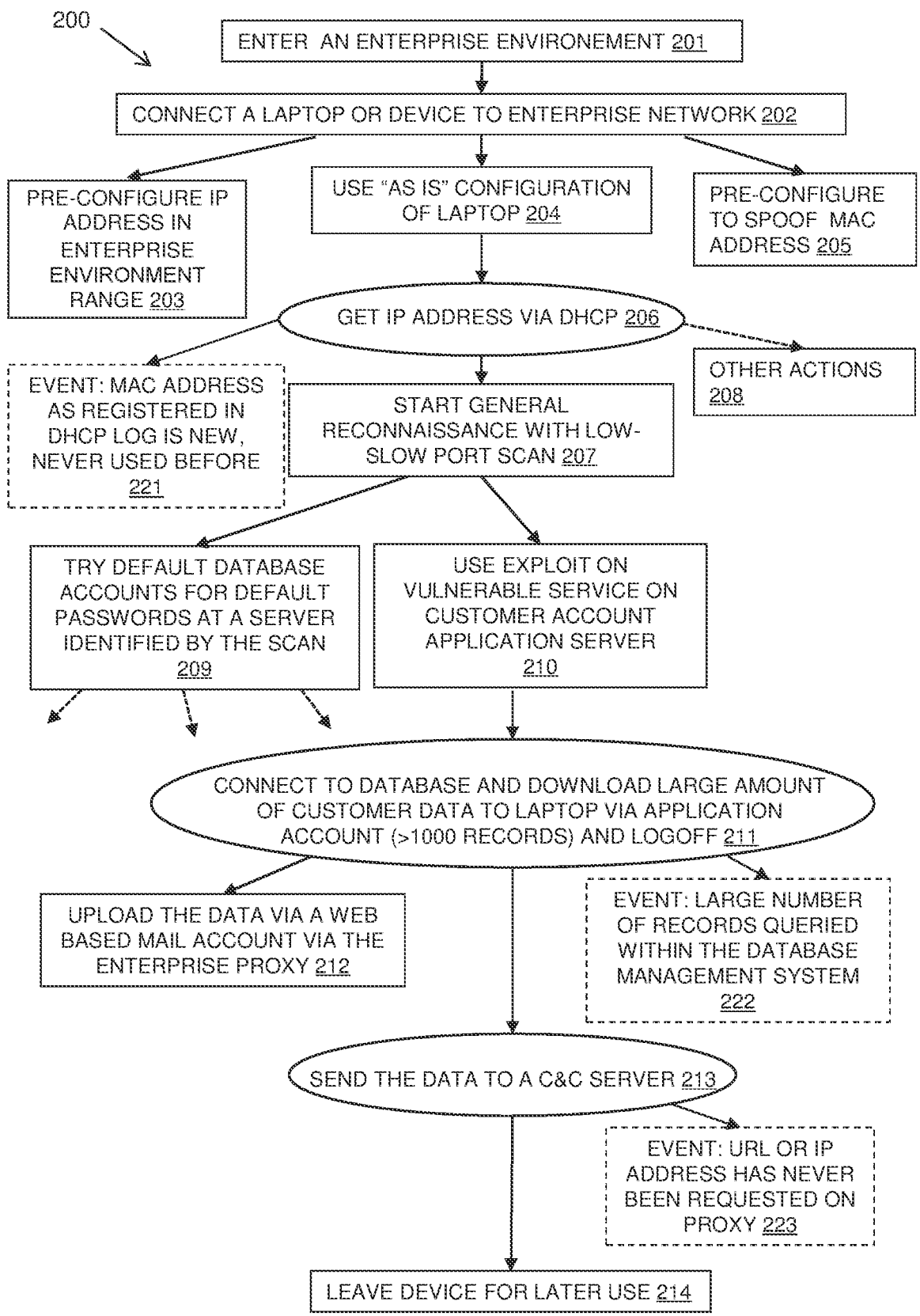
FIG. 2 is a schematic diagram showing an attack tree as used in an example embodiment of the method of FIG. 1, in accordance with embodiments of the present invention.

FIG. 2 is a schematic diagram of an example attack tree 200 to illustrate the described method. The depicted nodes correspond to actions taken by an attacker. A root node 201 is shown as the attacker entering an enterprise environment. Node 202 is a child node of the attacker connecting a laptop or device to the enterprise network. The respective instances of child node 203, child node 204, and child node 205 include options of the user pre-configuring an IP address in the enterprise environment range (child node 203), using an "as is" configuration of the laptop (child node 204), or pre-configuring to a spoof MAC address (child node 205).

In one scenario, an attack tree path through the attack tree 200 may go from the node 204 using and "as is" configuration of the laptop to a child node 206 of getting an IP address via a Dynamic Host Configuration Protocol (DHCP). In this scenario, attack tree 200 proceeds to options of respective child node 207 and child node 208, of starting a general reconnaissance with low-slow port scan (child node 207) or other actions (child node 208).

The attack tree path may proceed from node 207 to one or more of child node 209 and child node 210 for options of trying default database accounts for default passwords at a server identified by the scan (child node 209) and using exploit on vulnerable service on customer account application server (child node 210).

In a further scenario, the attack tree path may proceed from node 210 to child node 211 of connecting to a database and downloading a large amount of customer data to the laptop via an application account where more than 100 records are downloaded and then logging off. In this scenario, the attack tree path can proceed to options of possible child node 212 and child node 213 of uploading the data via a web-based mail account via the enterprise proxy (child node 212) or sending the data to the attacker's Command and Control (C&C) server (child node 213). Additionally, the attack tree path may perform node 213 and then proceed to child node 214 of leaving the device for later use.

Examples of feature selection from the attack tree based on the baseline principles of "the degree of uniqueness" are shown as event 221, event 222, and event 223.

In an example embodiment, the device used by the attacker has never been seen on the enterprise network. Therefore, the MAC address in the DHCP log has never been registered before (event 221). In this example embodiment, the attacker can choose to leave the device and send the data to the attacker's C&C center, thus yielding a feature (i.e., event 223) that no other point in the infrastructure will communicate to the C&C (in this attack scenario). Also, no other occurrences of the destination IP addresses or Destination URLs (uniform resource locators), apart from the events, will be found in the internet proxy.

In the scenarios depicted in example attack tree 200, the attacker is extracting data by querying the database. The extraction of the data is another feature (i.e., event 222) that can be used to identify the attack.

Features identified by the above principles may be enough to generate fine grained output for detection purposes. However, there may be a lot of overlap with normal, non-malicious actions of other users. For example, users that connect to the network with a brand new corporate laptop produce the event of a new MAC address in the network; non-malicious valid application users might query the database; users in the network may access web sites that have been created recently therefore producing a unique connection to the URL.

Therefore, embodiments of the present invention recognize a need for a method tie the risk bearing events together. The philosophy is that the false positives will be (to a certain degree randomly) distributed over the entity identifiers. Over time the distribution can lead to a modest correlation score, not going over the threshold for a alert. However, in case of real malicious behaviour, the scores will stack up and exceed the threshold.

Embodiments of the present invention utilize rules to pick up a genuine threat if an attacker performs malicious actions consistently. For example, the attacker may spoof the MAC address and the new MAC address rule will not be triggered. However, other rules will help identify the intent of the attacker.

In a traditional STEM approach, 'correlation' is expressed with Boolean logic resulting in a TRUE or FALSE. The rules are based on Boolean logic AND and OR, where the Boolean logic is usually applied to simple checks on data fields. For example, <rule fires> when <user account has been created less than 30 days> <user logs in from a Tor node, based on threat feed information> AND <user queries more than 30 customer records> (Tor is an abbreviation of The Onion Router, a network of nodes that helps obfuscate the real IP address).

Embodiments of the present invention recognize that the traditional SIEM approach has disadvantages, such as AND logic does not consider the impact of data that is outside the intersection of the rule. If the attacker takes slightly different other steps, there is no detection. Also, AND and OR logic is hard to assess when a large number of use cases is implemented. It is hard to identify which rules got triggered on a basis of what circumstances.

Therefore, embodiments of the present invention provide a loose coupling of the output of the rules by utilizing the rules to produce a risk correlation score.

Embodiments of the present invention can generate the risk weightings in an initial setup for a target environment by leveraging an expert estimate that provides a sensible system of weights for the rules. However, after the initial setup for a target environment, testing may be applied (for example, though "Red Team" attack exercises) and analysis of security incidents to re-adjust the weights. The weightings can indicate how reliably the output of the rule will point to malicious behavior. If indicative of low reliability, then a lower weighting is given, and if highly reliable (e.g., traffic towards a known Command & Control center for a botnet) then a high weighting is given.

A rule can be a traditional rule or the outcome of a statistical calculation. For example, communication to an IP address that has been put on a black list because the IP address is a known part of an international botnet for banking malware, has a relatively high weight because the black list is reliable. A rule of an action such as downloading data from an application can have a lower score. The fact that data is downloaded from an application bears a certain degree of risk but the overlap with normal end user behavior may be causing a lower correlation score. However, if the amount of data that is downloaded is an anomaly, embodiments of the present invention can assign the rule a higher correlation score.

Figure 3:
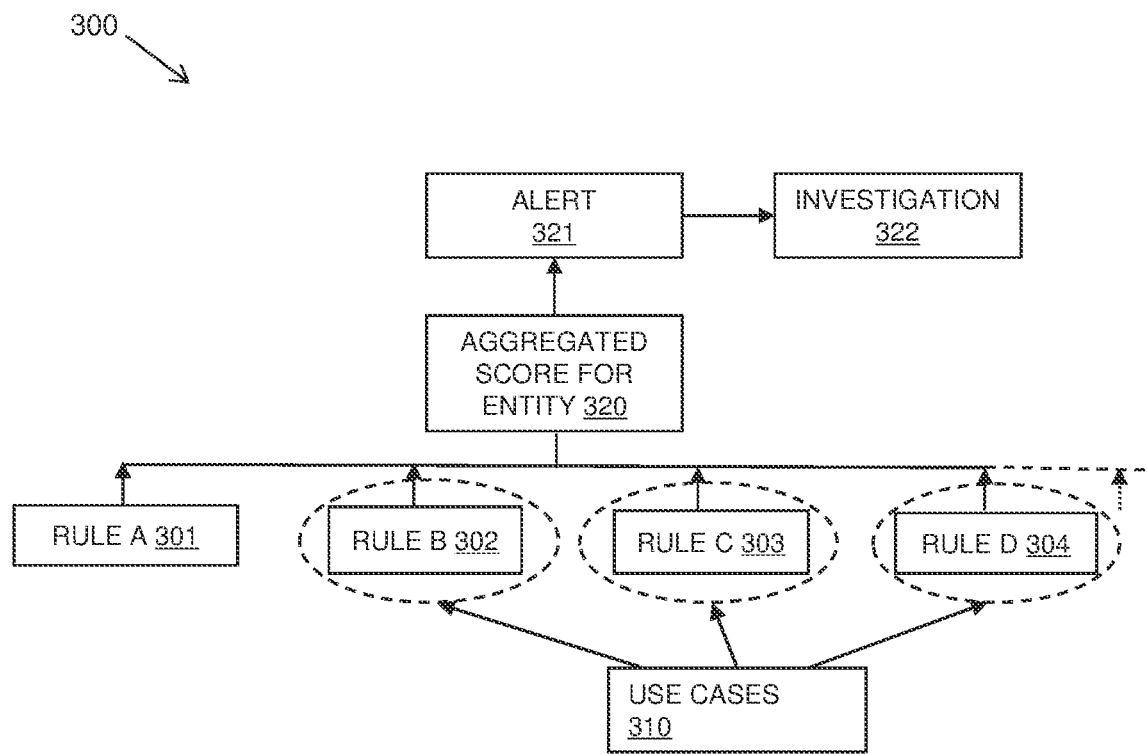
FIG. 3 is a schematic diagram showing aggregated rules as used in an example embodiment of the method of FIG. 1, in accordance with embodiments of the present invention.

Referring to FIG. 3, a schematic diagram 300 shows an example embodiment of scoring of the output of rules.

FIG. 3 illustrates four rules: Rule A 301, Rule B 302, Rule C 303, and Rule D 304. Each rule may have a risk weighting. Use cases 310 may cause a hit on multiple instances of rule 302, rule 303, and rule 304, with corresponding risk weightings added to an aggregate score 320 for an entity. In response to an aggregate score reaching a threshold, embodiments of the present invention trigger an alert (e.g., alert 321) and initiate an investigation (e.g., investigation 322).

The score is registered by an entity identity available from sources, which may be an IP address, hostname or user name, MAC address, etc. A criterion is that the entity identity is fixed over time in the relation to an entity such as an asset or person (i.e., to reduce noise to the correlation risk score). For example, if an IP address of an end point changes frequently due to the use of DHCP as a protocol, then the relation to an endpoint that is possessed by a person is not fixed. For this situation, risk correlation scores are not added to the IP address dimension, since such an addition can cause confusion on which end point is behaving suspiciously. Alternatively, the risk scoring model may be adapted to calculate over short periods of time for an entity identity. In an example scenario, a reliable trigger is when an IP address is showing a lot of bad activity in a short time within the lease of the IP address. However, over time the trigger has decreasing reliability, since the host will get a different IP and the old IP may be leased to another host, which would lead to a blurring of the risk correlation score.

Figure 4:
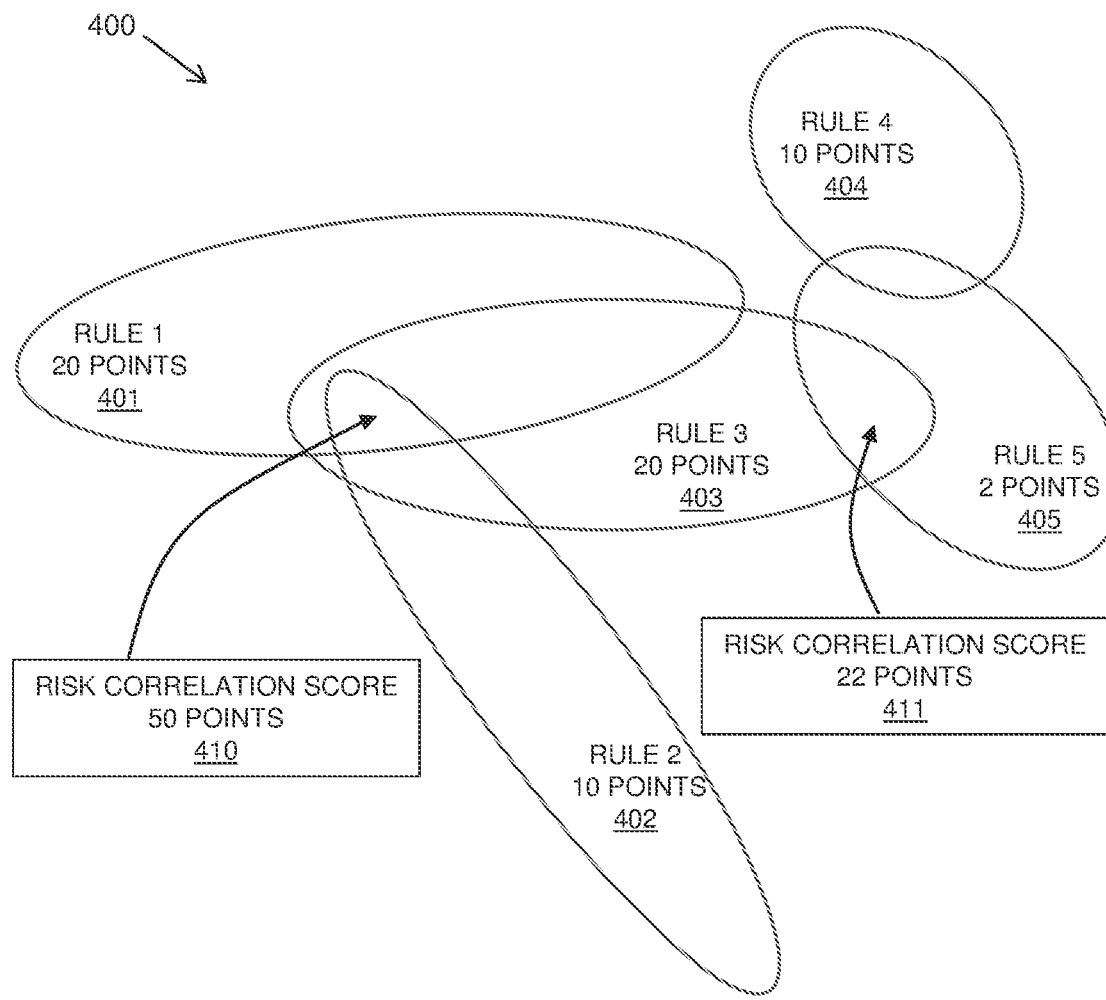
FIG. 4 is a schematic diagram showing coupled rules as used in an example embodiment of the method of FIG. 1, in accordance with embodiments of the present invention.

Referring to FIG. 4, a schematic diagram 400 depicts a loose coupling of rules by aggregated scores in a space for entity identifiers, such as user accounts. In various embodiments of the present invention, multiple rules may be triggered over time that relate to a user account. The rules have risk weightings shown in the depicted example as points. In the illustrated space, the ovals represent the set of user accounts that satisfy a rule. In the depicted example, Rule 1 401 has 20 points, Rule 2 402 has 10 points, Rule 3 403 has 20 points, Rule 4 404 has 10 points, and Rule 5 405 has 2 points. For example, in the oval of Rule 1 401, all user accounts are contained that satisfy Rule 1 over a time period. Accordingly, overlap in the ovals indicates that the user accounts in the overlap satisfy multiple rules in the same time frame.

Further, the intersections represent the set of user accounts that satisfy multiple rules. Therefore, embodiments of the present invention add up the correlation scores to produce an aggregate score for each user account in each intersection. In the illustrated example, a risk correlation score of 50 points 410 is achieved for the triggering of Rule 1 401, Rule 2 402, and Rule 3 403. Similarly, a risk correlation score of 22 points 411 is achieved for the triggering of Rule 3 403 and Rule 5 405.

Figure 5A:
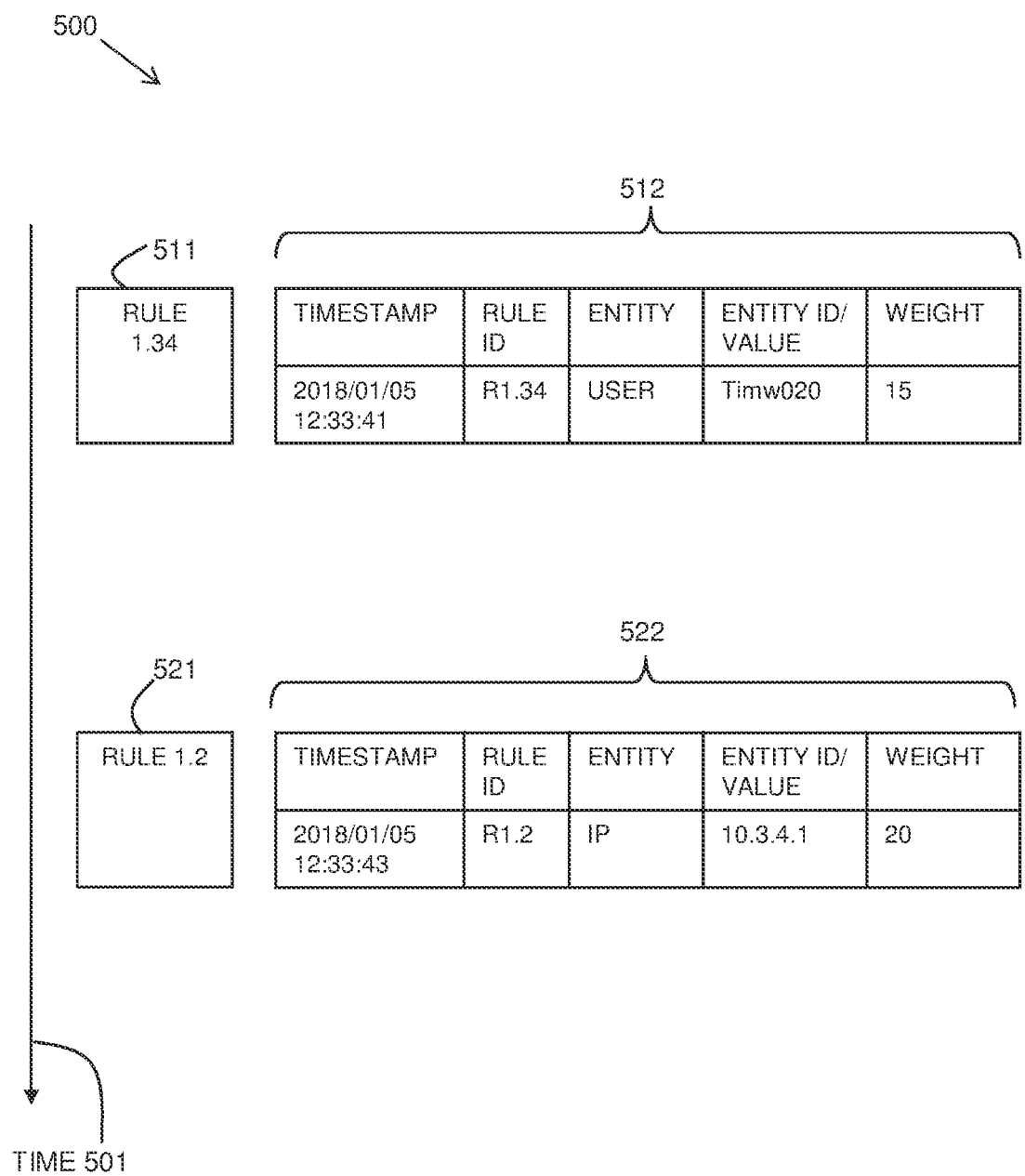
FIGS. 5A and 5B are schematic diagrams showing rule outputs and score aggregation as used in an example embodiment of the method of FIG. 1, in accordance with embodiments of the present invention.
Figure 5B:
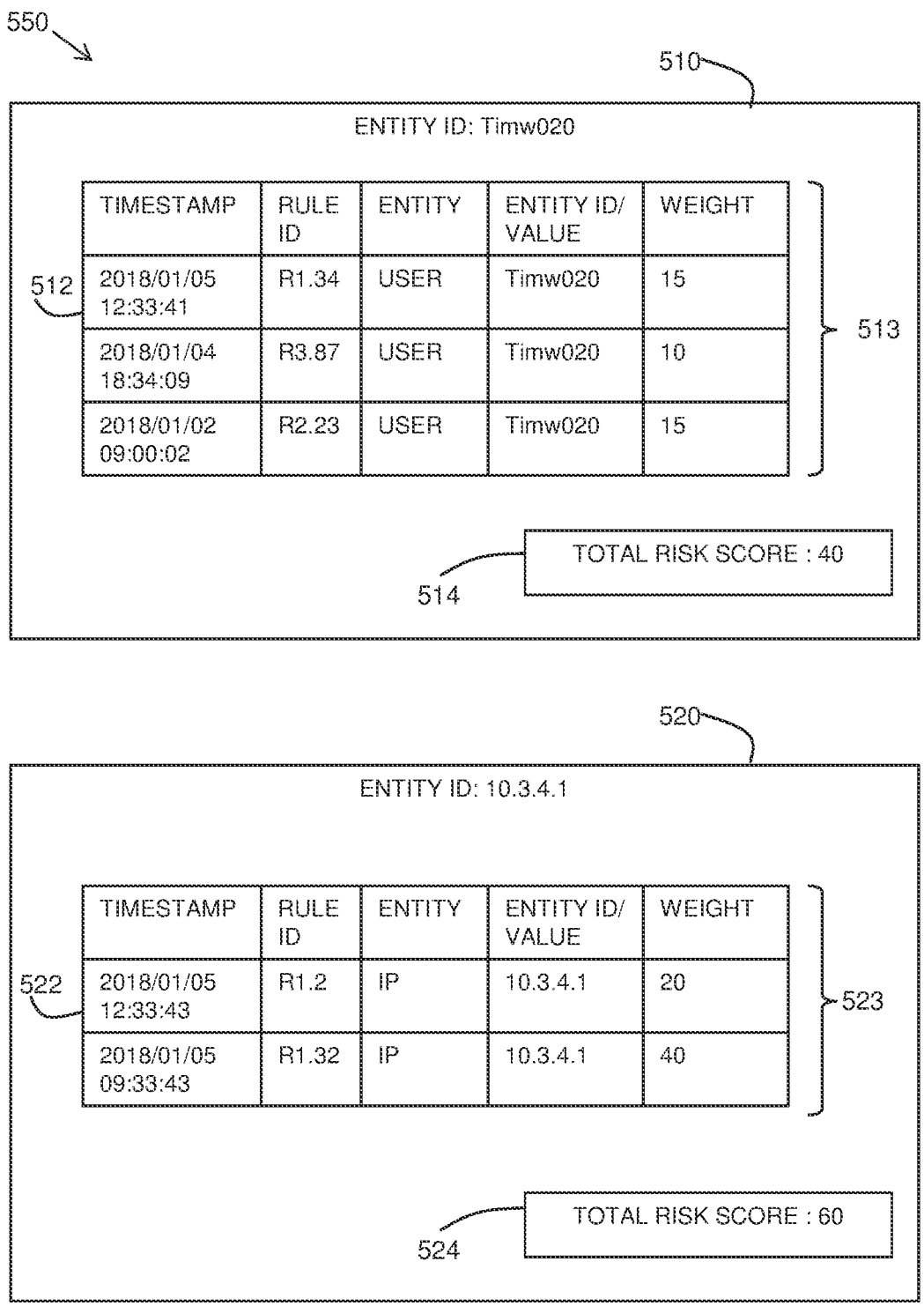

Referring to FIG. 5A and FIG. 5B, schematic diagram 500 and schematic diagram 550 (respectively) depict an example embodiment of rule processing.

FIG. 5A shows rule 511 and rule 521 being triggered in a STEM system or other analytics driven system in a timeline 501. For each instance of rule 511 and rule 521 that is triggered, a risk score record (e.g., risk score record 512 and risk score record 522) is added for an entity identifier of the rule.

In the illustrated example, a first rule 511, "Rule 1.34," is triggered relating to an entity identifier of a user name. Embodiments of the present invention generate a risk score record 512, which provides fields of the timestamp of the triggered rule, the rule ID, the entity to which the rule relates, the entity identifier, and the weight. For the first rule 511, the timestamp is 12:33:41 on 2018 Jan. 5, the rule ID is Rule 1.34, the entity is a user, the entity value is the user name Timw020, and the weight is 15.

Also, in the illustrated example a second rule 521, "Rule 1.2," is then triggered, relating to an entity identifier of an IP address. Embodiments of the present invention generate a risk score record 522, which provides fields of the timestamp of the triggered rule, the rule ID, the entity to which the rule relates, the entity identifier, and the weight. For the second rule 521, the timestamp is 12:33:43 on 2018 Jan. 5, the rule ID is Rule 1.2, the entity is an IP address, the entity value is the IP address value of 10.3.4.1, and the weight is 20.

FIG. 5B, depicts aggregated rule hits (i.e., triggered rules) for an entity identifier, as compiled by a risk correlation application. In the depicted embodiment, entity identifier object 510 has been created for the user name "Timw020" and includes aggregated records 513, which includes the addition of the latest record 512 (of FIG. 5A). Embodiments of the present invention add the new weight of 15 of the latest record 512 to the previous weights of records for the user name and the total risk correlation score 514 is obtained as 40.

In addition, the depicted embodiment includes an entity identifier object 520, created for the IP address "10.3.4.1" that includes aggregated records 523, to which the latest record 522 (of FIG. 5A) is added. Embodiments of the present invention add the new weight of 20 of the latest record 522 to the previous weights of records for the user name and the total risk correlation score 524 is obtained as 60.

Embodiments of the present invention recognize that the SIEM system, or any other analytics driven system, produces risk correlation score records every time a rule is triggered. Rules such as "IP address is new," "number of requests is greater than 10 per minute" etc., produce a score when the rule fulfills the criterium (i.e., condition is True). However, the aforementioned rule types may not be the only one, as risk correlation scores may also be added on an entity identifier (such as a user or IP address) based on a probability function.

In an example embodiment, a risk score is calculated based on a distribution of the number of records users query on a database. If the user queries a number of records that has a probability of 10E-06 (i.e., not a number that occurs frequently), 6 points are added, for 10E-5 5 points are added (i.e., add the 10 log of the probability of the action to the score). This example embodiment is a different process for aggregating scores relative to an existing SIEM system (i.e., the SIEM system does not include the functionality).

Various methods may be used to generate an alert from the risk correlation score. For example, the score may exceed a simple fixed threshold of 100 points or the score may increase with 40 points in an hour.

Various aspects of the present invention provide advantages that events can be correlated over months or larger spans of time, given the relative low volume of risk correlation records. The aforementioned event correlation is not achievable in the traditional way of correlation, where the dimension points have to be in lists in computer memory and the calculations are done over the data source records, which account for huge volumes. Embodiments of the present invention can still identify attackers with a low and slow tactical approach, since actions that are spread over weeks or months will be captured. The individual risk correlation scores are still be added and can produce an alert over the longer term.

Recalculation of Risk Correlation Scores

Analysis of security incidents or data breach simulations may reveal that the initial expert estimate of the weight for rules relative to the perceived match to malicious behavior is suboptimal. Rules may in reality be less or even more indicative of malicious behavior in the target environment prompting the need for a recalculation of the risk weights.

Various embodiments of the present invention can utilize a set of records, with an assessment of which records are associated with malicious behavior and which are not, to run a multivariate analysis to see which rule weightings produce an optimal detection score and the lowest false positive ratio. The weightings for the rules may then be adjusted accordingly. The aforementioned methodology of embodiments of the present invention simplify the adjustment. As an example, with regard to FIG. 5B, the risk score is recalculated if Rule R1.34 should have a weight of 10 instead of 15, leading to a total risk correlation score of 35 for user "Timw020."

Additional embodiments of the present invention can utilize a reliable set of tagged malicious risk score records, over a period of time, together with the risk scores that correspond to normal behavior, to calculate the weights of the rules that would produce an optimal false positive ratio and minimal false negatives.

Prevention of Ever-growing Risk Correlation Scores

The risk score records will produce an ever-growing risk score since data will be flowing in to the SIEM system from the data sources. From a control point of view this should be avoided. Although other methods can be considered, removal of risk correlation scores after a period of time is a way to get to an equilibrium state, for example, the period may be 3-6 months. If records are not associated with malicious behavior after several months, they may have been normal behavior and can be removed.

The risk scores may be a moving time window with a period that can be chosen, but that should cover a typical time frame that an attacker can use to spread the malicious activities over, so typically up to 6 months. In general, the data volume of the risk score records will be manageable. As an example, a set of 100 rules that produce 1000 hits per day will add up to 90 million records over 3 months, which can be processed by an average personal computer.

Application of Machine Learning Algorithms

Various embodiments of the present inventions also provide an opportunity to integrate with a machine learning system. Over time the risk correlation score records may be tagged based on malicious behavior. In such embodiments, algorithms (such as gradient boosting methods and calculating random forests) may signal malicious behavior with far lower detection thresholds. The approach using data sets with risk correlation scores will reduce the volume of data and provide a data set that is condensed and based on features that relate to risk.

The application of machine learning to this field is enabled by the methodology. Embodiments of the present invention recognize that research efforts can fail because of the use of the raw source data on which to try and build models. However, the complexity and volume are so large that the results are not good enough to work in practice. Embodiments of the present invention can reduce the volume to a fraction of the source log data, while preserving context, and therefore facilitating the application of machine learning.

Various embodiments of the present invention utilize machine to trigger an alert based on the aggregated output of the rules. One method is to simply set a threshold on the score. Alternatively, machine learning may be applied to produce a model for triggering the alert. A machine learning model may be more sensitive than just a threshold and may pick up more subtle signals, such as a quick increase of two features even when it is below the threshold score.

Over a period of time, risk score records may be collected, and a training set may be manually reviewed to mark the records that are identified as malicious behaviour. Algorithms may then learn on what is malicious and what is not. In the example depicted in FIG. 6, the features (i.e., timestamp) are chosen, the rule-ID and the value of the entity identifier are used, although other combinations may be used including the weightings.

The algorithm can then produce a model for use on the test set and the model can predict if the behavior is malicious or not. The prediction of the model may be checked versus expert judgment of whether the records are indeed malicious. When the model predicts a high number of records correctly, the model is reliable, otherwise the model may be re-run with other features.

Figure 6:
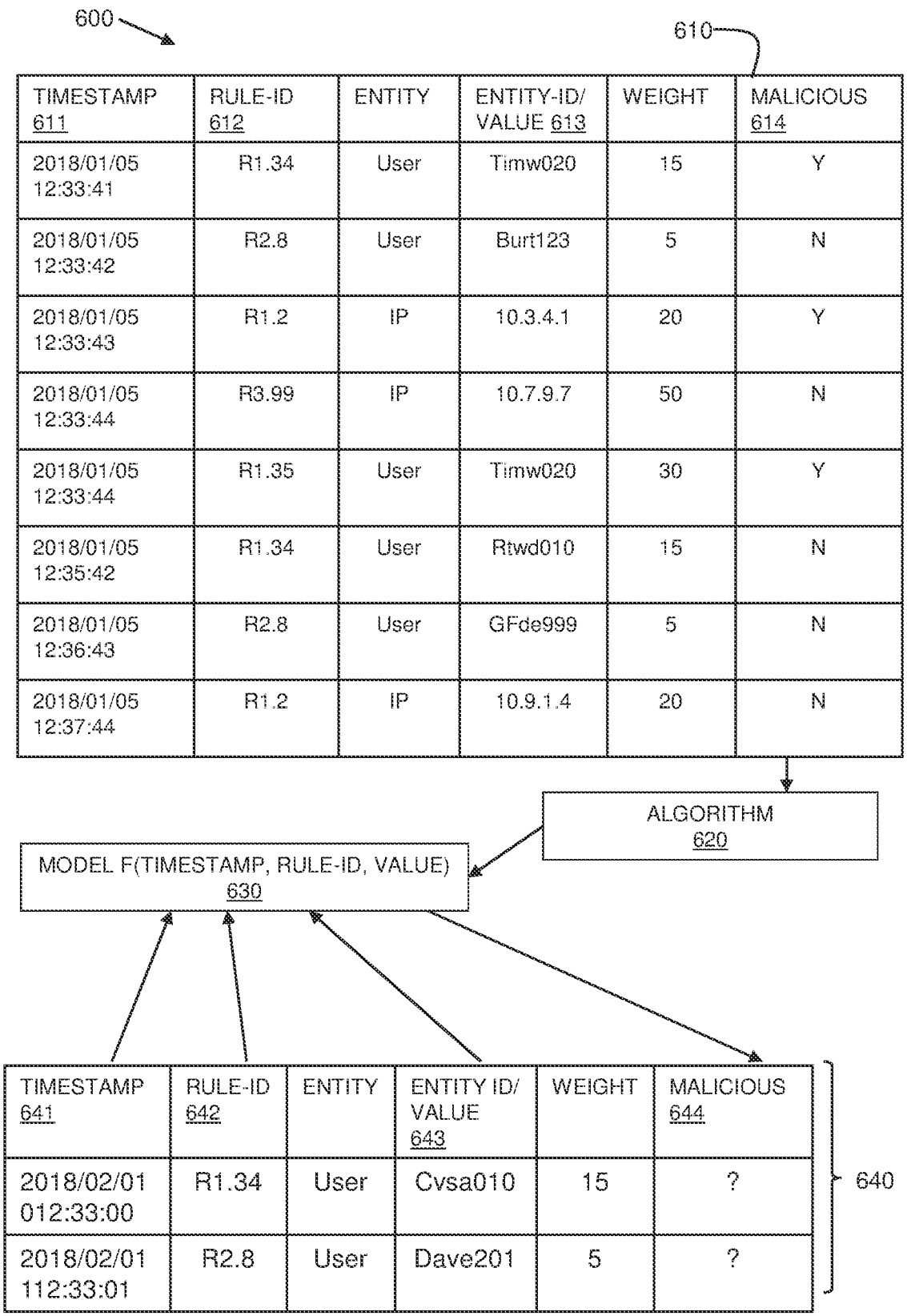
FIG. 6 is a schematic diagram showing training data for rules as used in an example embodiment of the method of FIG. 1, in accordance with embodiments of the present invention.

Referring to FIG. 6, a schematic diagram 600 shows a training data set 610 with historical and verified data of rule records with verified outcomes of whether the triggered rules relate to malicious behavior 614. Embodiments of the present invention utilize the training data set 610 train an algorithm 620 to predict the variable "malicious" 614 based on the variables of: timestamp 611, rule ID 612, and the entity identifier 613 providing a model 630 of the function, F(timestamp, rule ID, entity identifier). More variables may be added to the model, for example, such as the time difference between two incoming risk score records for the same user account.

Incoming rule score records 640 may have respective variables, such as timestamp 641, rule ID 642, and entity identifier 643, fed to the model 630 to predict the malicious variable 644.

Aspects of the present invention leverage the advantages of machine to provide a system that can detect statistical relationships that an analyst would not be able to recognize when browsing through records and alerts.

The advantages of the described method and system include: the simplified identification of rules from attack trees; optimal use of deviations from normal behavior in an environment; correlation of relevant events over time; low numbers of false positives in combination with a good detection capability; and a reduced data set that machine learning algorithms may be applied.

Figure 7:
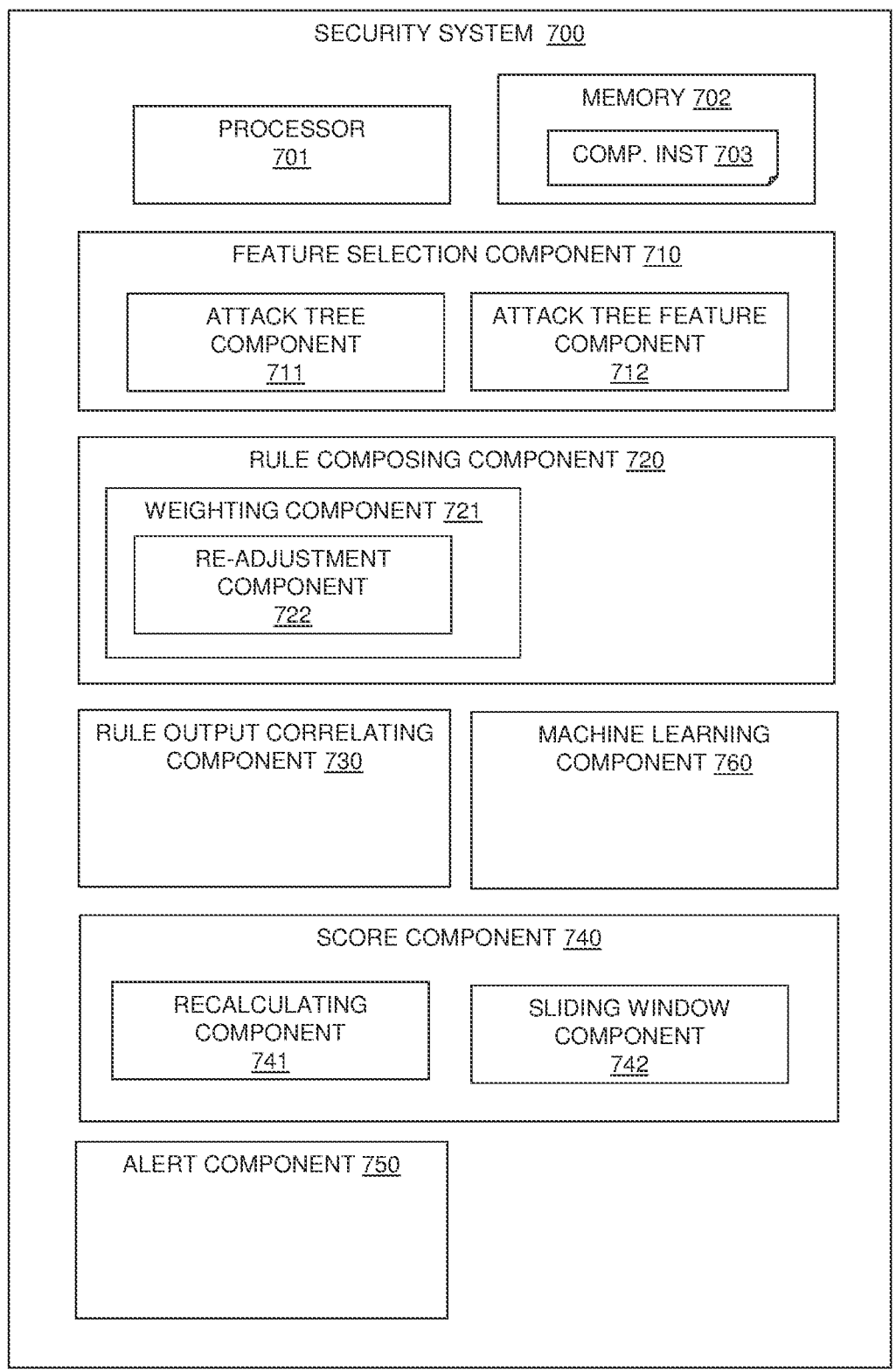
FIG. 7 is block diagram of an example embodiment of a system, in accordance with embodiments of the present invention.

Referring to FIG. 7, a block diagram illustrates an example embodiment of the described security system 700 for composing and applying security monitoring rules to a target environment. In an example. the security system may be incorporated into a SIEM system.

The security system includes at least one processor 701, a hardware module, or a circuit for executing the functions of the described components which may be software units executing on the at least one processor. Multiple processors running parallel processing threads may be provided enabling parallel processing of some or all of the functions of the components. Memory 702 may be configured to provide computer instructions 703 to the at least one processor 701 to carry out the functionality of the components.

The security system 700 includes a feature selection component 710 for selecting features in the form of events in the target environment identifying an attack. The feature selection component 710 may include an attack tree component 711 for defining an attack tree of events for a target environment, which defines paths of possible events in a security attack and an attack tree feature component 712 for selecting features of the attack tree identifying an attack. The attack tree feature component 712 may compare a degree of uniqueness of an activity compared to a normal activity in the target environment and/or on a combination of essential features in the attack tree.

The security system 700 also includes a rule composing component 720 for composing security monitoring rules based on the selected features and relating to an entity identifier that is fixed over time in relation to an entity in the target environment. The rule composing component 720 may include a rule weighting component 721 for weighting the rules for according to a probability that the rule positively identifies an attack.

The rule weighting component 721 may determine weighting factors for the rules based on an initial configuration and may include: a re-adjustment component 722 for re-adjustment of the weightings based on testing and analysis of security incidents in the target environment.

The security system 700 also includes a rule output correlating component 730 for generically correlating the outputs of multiple activated rules relating to an entity identifier that are activated over time in response to events occurring in the target environment.

The security system 700 also includes a score component 740 for aggregating weightings from multiple activated rules over time to provide a score for an entity relating to the entity identifier. The score component 740 may include a recalculating component 741 for recalculating risk correlation scores further to analysis of security incidents and re-adjustment of rule weightings. The score component 740 may also include a sliding window component 742 for using a sliding window of a period of time for aggregating weightings from multiple activated rules.

The security system 700 may also include a machine learning component 760 for applying machine learning to train a model to predict an attack risk for a rule output based on a training data set with verified rule records.

The security system 700 may also include an alert component 750 for providing an alert in response to a score for an entity meeting a threshold.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

Figure 8:
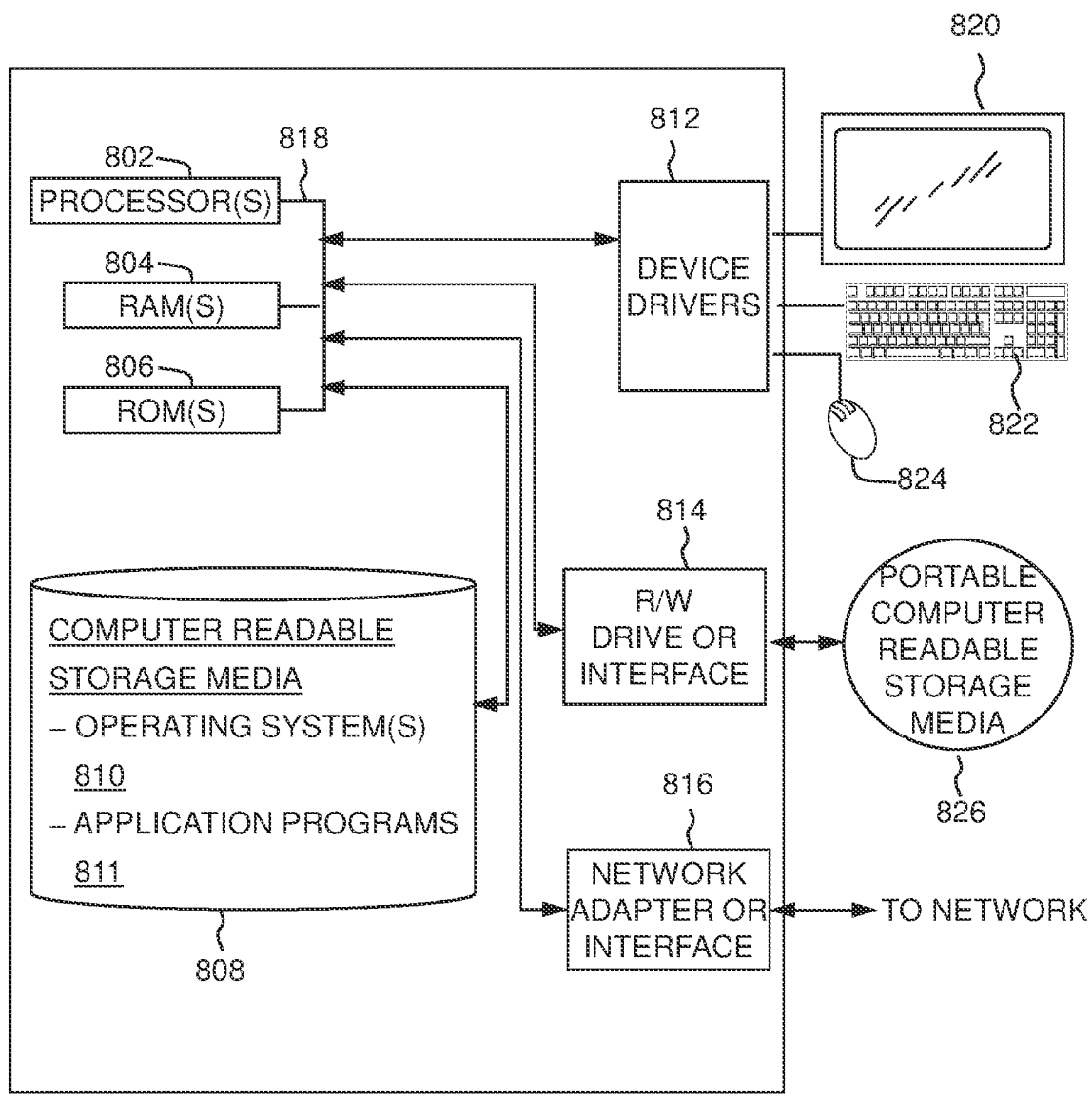
FIG. 8 is a block diagram of an embodiment of a computer system or cloud server in which the present invention may be implemented, in accordance with embodiments of the present invention.

FIG. 8 depicts a block diagram of components of a computing device of the security system 700 of FIG. 7, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Computing device can include one or more processors 802, one or more computer-readable RAMs 804, one or more computer-readable ROMs 806, one or more computer readable storage media 808, device drivers 812, read/write drive or interface 814, and network adapter or interface 816, all interconnected over a communications fabric 818. Communications fabric 818 can be implemented with any architecture designed for passing data and/or control information between processors (such as microprocessors, communications and network processors, etc.), system memory, peripheral devices, and any other hardware components within the system.

One or more operating systems 810, and application programs 811, are stored on one or more of the computer readable storage media 808 for execution by one or more of the processors 802 via one or more of the respective RAMs 804 (which typically include cache memory). In the illustrated embodiment, each of the computer readable storage media 808 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 814 to read from and write to one or more portable computer readable storage media 826. Application programs 811 on computing device can be stored on one or more of the portable computer readable storage media 826, read via the respective R/W drive or interface 814 and loaded into the respective computer readable storage media 808.

Computing device can also include a network adapter or interface 816, such as a TCP/IP adapter card or wireless communication adapter. Application programs 811 on computing device can be downloaded to the computing device from an external computer or external storage device via a network (for example, the Internet, a local area network or other wide area networks or wireless networks) and network adapter or interface 816. From the network adapter or interface 816, the programs may be loaded into the computer readable storage media 808. The network may comprise copper wires, optical fibers, wireless transmission, routers, firewalls, switches, gateway computers and edge servers.

Computing device can also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, R/W drive or interface 814, and network adapter or interface 816 can comprise hardware and software stored in computer readable storage media 808 and/or ROM 806.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
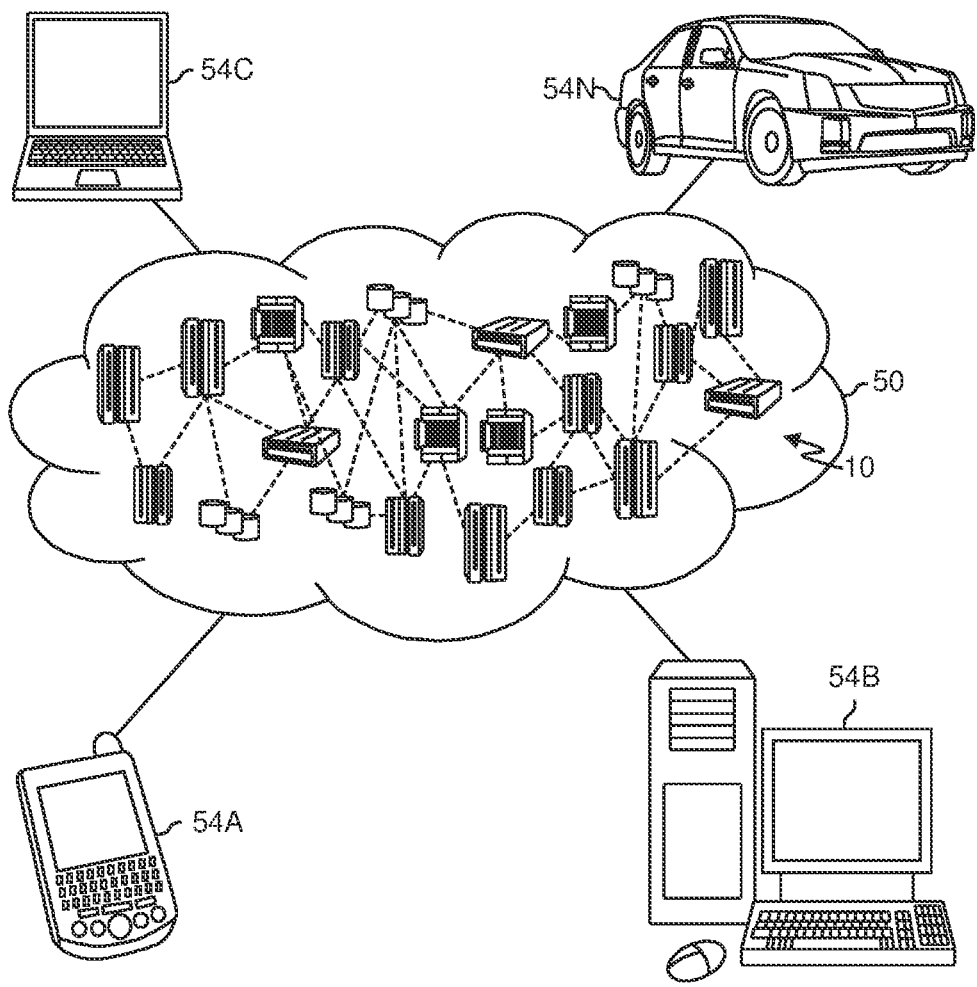
FIG. 9 is a schematic diagram of a cloud computing environment in which the present invention may be implemented, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
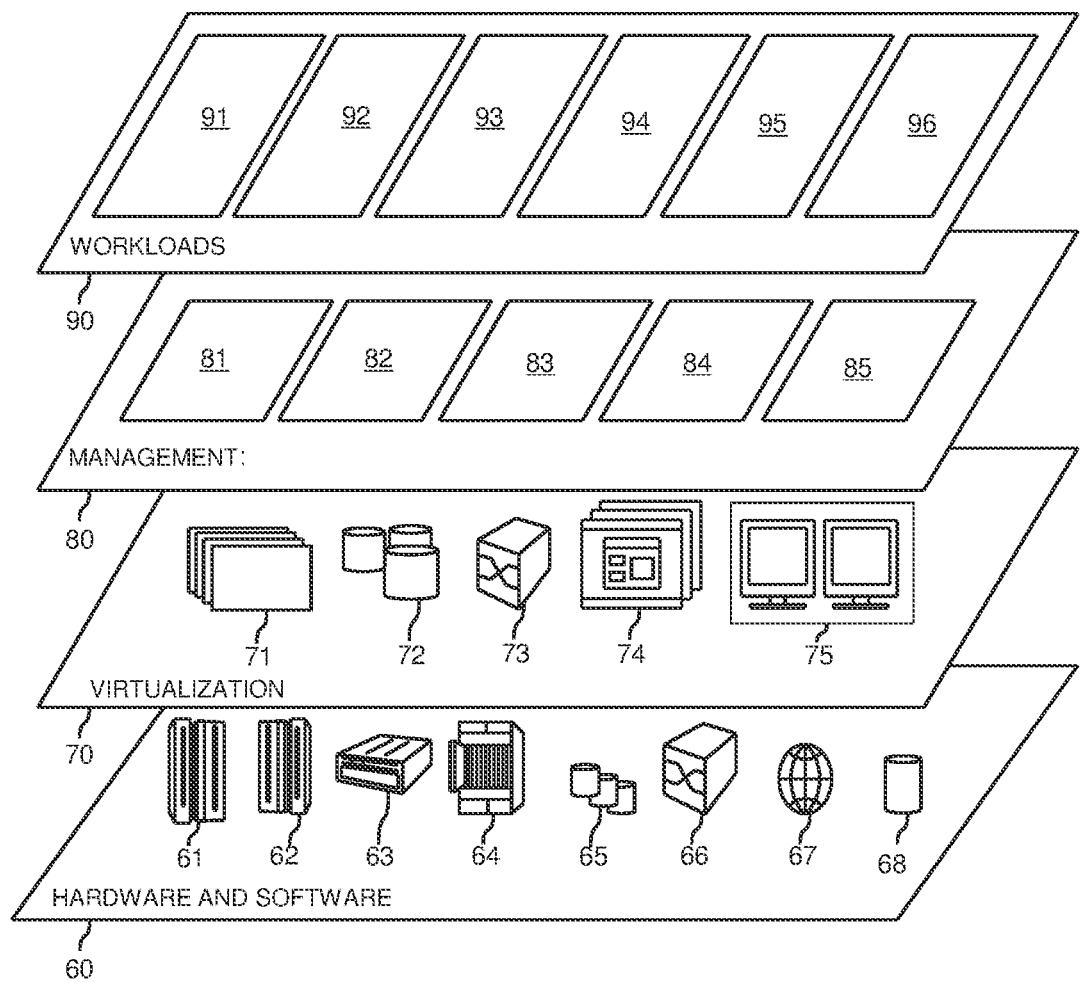
FIG. 10 is a diagram of abstraction model layers of a cloud computing environment in which the present invention may be implemented, in accordance with embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security monitoring rule composing and applying 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method comprising:
    defining, by one or more processors, an attack tree that includes events performed on a target environment, wherein the attack tree defines paths of possible events in a security attack;
    selecting, by one or more processors, features of the attack tree that are associated with an indication of the security attack on the target environment;
    composing, by one or more processors, security monitoring rules based on the selected features and relating to an entity identifier that is an identifier for an entity in the target environment fixed over a period of time;
    weighting, by one or more processors, the security monitoring rules according to a probability that the rule positively identifies an actual security attack;
    correlating, by one or more processors, outputs of multiple activated rules of the security monitoring rules relating to the entity identifier that are activated over time in response to events occurring in the target environment;
    aggregating, by one or more processors, weightings from the multiple activated rules;
    determining, by one or more processors, a correlated risk score for the entity relating to the entity identifier based on the aggregated weightings; and
    providing, by one or more processors, an alert in response to the correlated risk score for the entity meeting a threshold.

2. The method as claimed in claim 1, wherein selecting features is based on a degree of uniqueness of an activity compared to a normal activity in the target environment.

3. The method as claimed in claim 1, wherein the identified events are based on a combination of essential features in the security attack.

4. The method as claimed in claim 1, wherein weighting the security monitoring rules according to a probability that the rule positively identifies the security attack is based on an initial configuration with re-adjustment of weightings based on testing and analysis of security incidents in the target environment.

5. The method of claim 1, further comprising:
    dynamically recalculating, by one or more processors, the correlated risk score further based on security incidents and corresponding re-adjustment of rule weightings.

6. The method of claim 1, wherein the entity relates to an asset or person in the target environment and the entity identifier is one or more of: an Internet Protocol address, hostname, user name, media access control (MAC) address, or other entity identifier that is fixed over a period of time in relation to the entity.

7. The method as claimed in claim 1, wherein determining the correlated risk score for the entity relating to the entity identifier based on the aggregated weightings further comprises:
    producing, by one or more processors, an updated correlated risk score in response to a rule activation.

8. The method as claimed in claim 1, further comprising:
    aggregating, by one or more processors, weightings from the multiple activated rules utilizing a sliding window of a period of time.

9. A computer program product comprising:
    one or more computer readable storage media and program instructions stored on the one or more computer readable storage media, the program instructions comprising:
    program instructions to define an attack tree that includes events performed on the target environment, wherein the attack tree defines paths of possible events in a security attack;
    program instructions to select features of the attack tree that are associated with the indication of the security attack on the target environment;
    program instructions to compose security monitoring rules based on the selected features and relating to an entity identifier that is an identifier for an entity in the target environment fixed over a period of time;
    program instructions to weight the security monitoring rules according to a probability that the rule positively identifies an actual security attack;
    program instructions to correlate outputs of multiple activated rules of the security monitoring rules relating to the entity identifier that are activated over time in response to events occurring in the target environment;
    program instructions to aggregate weightings from the multiple activated rules;

program instructions to determine a correlated risk for the entity relating to the entity identifier based on the aggregated weightings; and program instructions to provide an alert in response to the correlated risk score for the entity meeting a threshold.

10. The method as claimed in claim 9, wherein selecting features is based on a degree of uniqueness of an activity compared to a normal activity in the target environment.

11. The method as claimed in claim 9, wherein weighting the security monitoring rules according to a probability that the rule positively identifies the security attack is based on an initial configuration with re-adjustment of weightings based on testing and analysis of security incidents in the target environment.

12. The method as claimed in claim 9, wherein determining the correlated risk score for the entity relating to the entity identifier based on the aggregated weightings further comprise program instructions to:

produce an updated correlated risk score in response to a rule activation.

13. A computer system comprising:

one or more computer processors;

one or more computer readable storage media; and program instructions stored on the computer readable storage media for execution by at least one of the one or more processors, the program instructions comprising:

program instructions to define an attack tree that includes events performed on the target environment, wherein the attack tree defines paths of possible events in a security attack;

program instructions to select features of the attack tree that are associated with the indication of the security attack on the target environment;

program instructions to compose security monitoring rules based on the selected features and relating to an entity identifier that is an identifier for an entity in the target environment fixed over a period of time;

program instructions to weight the security monitoring rules according to a probability that the rule positively identifies an actual security attack;

program instructions to correlate outputs of multiple activated rules of the security monitoring rules relating to the entity identifier that are activated over time in response to events occurring in the target environment;

program instructions to aggregate weightings from the multiple activated rules;

program instructions to determine a correlated risk score for the entity relating to the entity identifier based on the aggregated weightings; and program instructions to provide an alert in response to the correlated risk score for the entity meeting a threshold.

14. The method as claimed in claim 13, wherein selecting features is based on a degree of uniqueness of an activity compared to a normal activity in the target environment.

15. The computer system of claim 13, wherein weighting the security monitoring rules according to a probability that the rule positively identifies the security attack is based on an initial configuration with re-adjustment of weightings based on testing and analysis of security incidents in the target environment.

16. The computer system of claim 13, wherein the entity relates to an asset or person in the target environment and the entity identifier is one or more of: an Internet Protocol address, hostname, user name, media access control (MAC) address, or other entity identifier that is fixed over a period of time in relation to the entity.

17. The computer system of claim 13, wherein determining the correlated risk score for the entity relating to the entity identifier based on the aggregated weightings further comprise program instructions to:

produce an updated correlated risk score in response to a rule activation.

\* \* \* \* \*